United States Patent [19]

Judy

[11] Patent Number: 5,664,917
[45] Date of Patent: Sep. 9, 1997

[54] CUTTER HEAD WITH INTERNAL DRIVE FOR MACHINING WORKPIECES

[76] Inventor: Raymond A. Judy, P.O. Box 335, Rouseville, Pa. 16344

[21] Appl. No.: 628,790

[22] Filed: Apr. 5, 1996

Related U.S. Application Data

[63] Continuation-in-part of Ser. No. 14,615, Feb. 8, 1993, abandoned, which is a continuation-in-part of Ser. No. 802,312, Dec. 4, 1991, Pat. No. 5,184,927.

[51] Int. Cl.[6] ........................................ B23C 3/28
[52] U.S. Cl. .................. 409/143; 279/53; 409/201; 409/215; 409/231
[58] Field of Search ........................... 409/143, 177, 409/201, 215, 231, 232, 233, 234, 230; 279/53; 408/124

[56] References Cited

U.S. PATENT DOCUMENTS

| | | | |
|---|---|---|---|
| 548,822 | 10/1895 | Stirling | 409/143 |
| 1,923,820 | 8/1933 | Gorton | 409/230 |
| 2,264,780 | 12/1941 | Weld et al. | 409/158 |
| 2,286,292 | 6/1942 | Mall | 409/231 |
| 2,372,913 | 4/1945 | Schmidt | 409/143 |
| 3,289,537 | 12/1966 | Adams | 409/143 |
| 4,400,859 | 8/1983 | Woythal et al. | 409/143 |
| 4,750,850 | 6/1988 | Husted | 409/233 |
| 5,184,927 | 2/1993 | Judy | 409/143 |

*Primary Examiner*—Daniel W. Howell
*Attorney, Agent, or Firm*—Clifford A. Poff

[57] ABSTRACT

A machine tool to machine a workpiece including linear slide blocks supported one by the other on a pedestal to present a mounting surface for supporting a workpiece, a support head including a rotary indexing table that in turn supports an elongated cutter bar the support head to define an outwardly projecting cantilever end portion that is in turn supported by an outboard support, a cutter tool supported for rotary movement about an axis transverse to the extended length of the cutter bar, a drive means extends along the cutter bar for rotating the cutter tool and a collet chuck for engaging the cutter tool located remote to bearing seats to prevent radial distortion of such bearings when the cutter tool is engaged.

24 Claims, 11 Drawing Sheets

CUTTER HEAD WITH INTERNAL DRIVE FOR MACHINING WORKPIECES

CROSS REFERENCE TO RELATED APPLICATION

This application is a continuation-in-part of U.S. Ser. No. 08/014,615, filed February 8, 1993, now abandoned which is a continuation-in-part of U.S. Ser. No. 07/802,312, filed Dec. 4, 1991, which issued as U.S. Pat. No. 5,184,927 on Feb. 9, 1993.

BACKGROUND OF THE INVENTION

1. Field of the Invention

This invention relates to a collet chuck for engaging a cutter tool situated remote to bearing seats so that radial distortion does not affect such bearings in a versatile machine tool for executing milling-type cutting operations on the external surfaces and particularly within internal passageways of a workpiece to form a desired machined surface such as spines, keyways or like machined surfaces.

2. Description of the Prior Art

In the metal working industry, the machining operations on a workpiece frequently include secondary precision machining operations to form key-way slots, grooves, tapped holes, blinds and the like. When these secondary machining operations are required on the external surface of the workpiece, a milling type machine of a vertical or horizontal type is suitable to carry out the machining operation. However, when an internal surface defined by a cylindrical bore in the workpiece must be machined, the nature of the machining operation dictates that the use of particular machining operation such as broaching, shaping, right angle head milling or electrical discharge machining methods. It is a common requirement to machine both internal and external surfaces on a workpiece whereby on the one hand external machining operations can be usually carried out very efficiently and economically, while on the other hand internal machining operations dictate that the workpiece must be transferred to a different machine tool which is not only time consuming but also adds to the machining costs. Moreover, it is virtually impossible to perfectly realign a previously machined surface in a setup operation for carrying out additional machining operations on that workpiece. Even after setup operations are completed to align a workpiece on a chosen machine tool, there remains a continuing problem associated with metal removal operations within an internal passageway of the workpiece because of a lack of working space. It is likely that problems will occur when performing internal machining operations in a cavity of a workpiece whereas when machining operations are carried out externally of the workpiece, the machining operations are generally trouble free.

It is common to use broaching machines for machining operations on an internal surface because of fast metal removal as well as machining operations on a stacked arrangement workpieces. The high cost of the machining using the broaching tool can be justified only on a large quantity of parts for cost effectiveness. Moreover, the broaching machine uses a long shaft with several cutting edges ground to the shape necessary to perform the needed machining operations. The cutting edges are positioned so that each successive edge cuts deeper than the previous cutting edge. When the broach is pulled or pushed a necessary extent through the workpiece, the machining operation is complete. Broaching machines also consume unusually large amounts of horsepower because considerable energy is required to operate the broach in relation to the size cut and of the large number of cutting edges in simultaneous contact with the workpiece. A clearance must be made available at the end of the cut to allow dumping of chips. As a result, the workpiece is broached through a cavity from each of opposite sides. A broaching machine requires an inordinate amount of floor space to carry out the machining operations due to the nature of the broaching operation. For example, a broach having a length of eight feet may be necessary for supporting a sufficient number of cutting edges for machining to a desired depth commencing at the small end of the broach. As the broach is pulled through the workpiece, the entire broach must pass to the opposite end part of the workpiece requiring an operating space about the surrounding floor area of sixteen feet in length plus the length of the workpiece. The cost of the valuable floor space increases the cost of the broaching operation. Broaches also, because of their mode of operation, impart a great shock on the workpiece at the commencement of the broaching operation. The broaching tool must be made of less brittle materials such as high speed steel which limits the use of the broach for cutting operations with workpieces comprised of softer materials. Carbide materials for broaching materials are occasionally used but they are very expensive to manufacture and are easily broken. The flexibility for machining operation by broaching machines is non-existent particularly because the cutters are uniquely formed for a single cutting operation and must be varied for each cutting operation. Broaching machines therefore do not embody the versatility needed for the machining operation.

Shaping machines are similar to a broaching machine because of the common requirements for a clearance to allow clearing or dumping of chips away from the tool. A single tool usually comprises the cutter made of high speed steel which consumes unusually large amounts of energy in the form of horse power of the machine which needlessly exposes the machining operation to the disadvantage of shock loads. Repetitive cutting strokes must be executed until a desired depth of cut is reached. Like a broach, shaping machines can not execute blind cuts because of the need for the cutting tool to operate within a clearance at both ends of the stroke of cut so as to allow the entrance and exiting of the tool without interference. Although shaping tools are less expensive than broaches, the machining operation with a shaping tool is slower and fills the need for machining operations in instances when an exact size broach is not immediately available and the quantity of pieces requiring the machining operation are relatively small in number. The shaping tool like the broach requires a clearance at the end of a machining operation but the size of the clearance is less for a shaping tool.

Right angle milling machines have numerous problems. The end of the cutting head opposite the tool carrying end is usually of a larger more robust construction to help stabilize and support the cutting tool. Because of the cantilever relation of the cutting head, the cutting tool lacks stability and because of the head size, it can normally penetrate only short distances into cavities of a workpiece notwithstanding the tapered construction of the cutting head. The unavoidable deflection of the cutting head due to its cantilever construction precludes the use of carbide tooling which will break under deflections by the cutting head, thus necessitating the use of high speed steels to form the cutting tools which are of a limited size. The right angle milling head offers certain desirable benefits including the use of rotary type tools which are less expensive and provide the opportunity to cut a variety of widths, execute plunge cuts, start and stop cutting without clearance and the cutting path is used for chip disposal. An example of a known machine tool is disclosed in U.S. Pat. No. 4,400,859 which discloses a cantilever shaped cutter arm supported by a spindle head to present a tool in a right angle relation to the extended length of the cantilever arm. The entire cutter spindle head including drive motor is moved on a bed for positioning of a cutting tool along X and Z axes while the workpiece can be traversed independently of the cutting head for Y axis adjustment. Also the workpiece is mounted on a turn-table like sub-base which can rotate about an axis that is vertical and parallel with the X axis movement of the spindle head. The mass making up the spindle head including its drive and necessary utilities precludes machining deeply within the cavity of a workpiece.

An electrical discharge machine is useful for carrying out internal and external machining operations on a workpiece but is expensive and the machining operations are limited by the particular construction of the electrical discharge machine. In an electrical discharge machine using a stretched wire for the cutting operation, any surface of the workpiece that may contact the wire will be cut and therefore the cutting operation is limited to a single plane. An electro-type machine uses a probe burner and allows cutting through a bore to a partial extent, plunge cutting and cutting in any desired plane. The cutting action by these machines involves burning which can cause surface damage to the workpiece, which can not be tolerated in many instances.

In these various types of apparatus, where a device is utilized to engage a cutter tool with a force sufficient to transmit the required torque for the cutting operation, the presence of bearing seats very close to such device means the likelihood of distortion of such bearings due to the radial distortion from such device. An example of such distortion would occur in an apparatus such as that disclosed in U.S. Pat. No. 2,372,913 which discloses an end mill placed in a hollow shaft and a bearing assembly as part of an internal and external milling attachment. When a screw is tightened to engage such end mill, the bearing assembly is likely distorted due to radial dissemination of the gripping force through such hollow shaft.

It is an object of the present invention to provide a collet chuck engaging a cutter tool which is located remote to bearing seats to prevent radial distortion of such bearings in a less expensive alternative machine well suited for machining internal surfaces of a workpiece and at the same time may be utilized to execute machining operations on the external surfaces of the workpiece so as to alleviate the need for time consuming and sometimes complicated set-up operations heretofore required to execute such machining operations on a variety of different machine tools.

SUMMARY OF THE INVENTION

More particularly according to the present invention there is provided in combination with an apparatus to machine a workpiece wherein an elongated cutter bar is carried at one end by a support head and an outwardly projecting cantilever end portion of the cutter bar supports a cutter tool for rotary movement about an axis transverse to the extended length of a cutter bar, and wherein the cutter bar includes a drive system extending therealong for imparting rotary movement to said cutter tool for machining a workpiece supported and positioned by a workpiece carrier for imparting relative movement between the cutter tool and the workpiece, the improvement which comprises a spindle drivingly coupled to said drive system for imparting rotary movement about said axis, bearing means supported by spindle bar at spaced apart location to engage with correspondingly spaced bearing seats on said spindle for rotatably supporting said spindle, truncated tapered surfaces between said spindle and said cutter tool, said truncated tapered surfaces mating and being relatively movable into an interfering relation outboard of said spaced apart bearing seats for imparting a gripping force on one of said tapered surfaces to grip said cutter tool while rotating about said axis whereby distortion of the interfering tapering surfaces is limited to an area outboard of said bearing seats, and means moving on said truncated tapered surfaces relative to one another in a manner to establish driving contact with said cutter tool.

BRIEF DESCRIPTION OF THE DRAWINGS

The present invention will be more fully understood when the following description is read in light of the accompanying drawings in which:

FIG. 13 is an exploded perspective view of a cutter bar according to a fourth embodiment of the present invention; and.

DETAILED DESCRIPTION OF THE PREFERRED EMBODIMENTS

Figure 1:
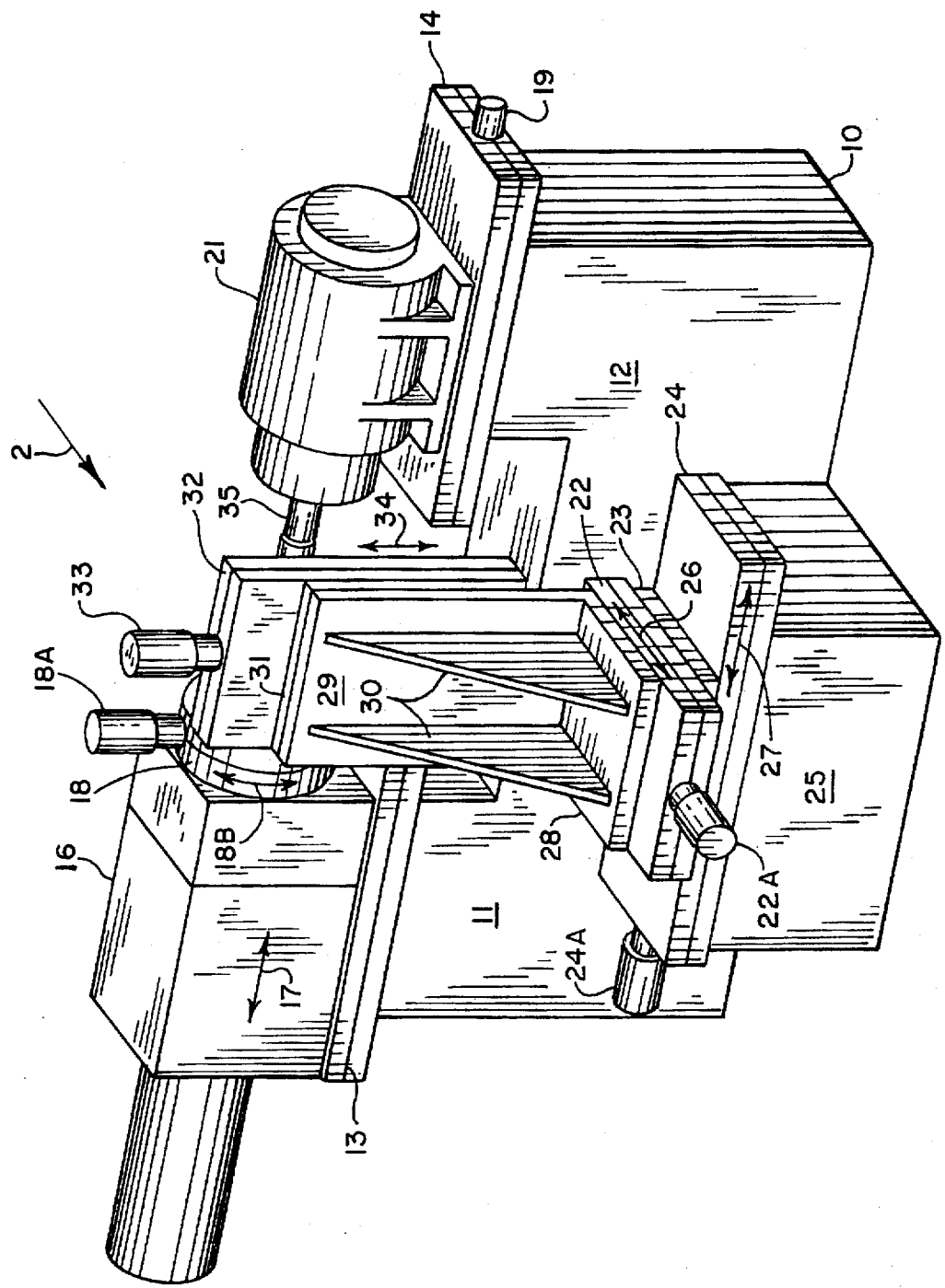
FIG. 1 is an isometric view of a machine tool embodying the features of the present invention.
Figure 2:
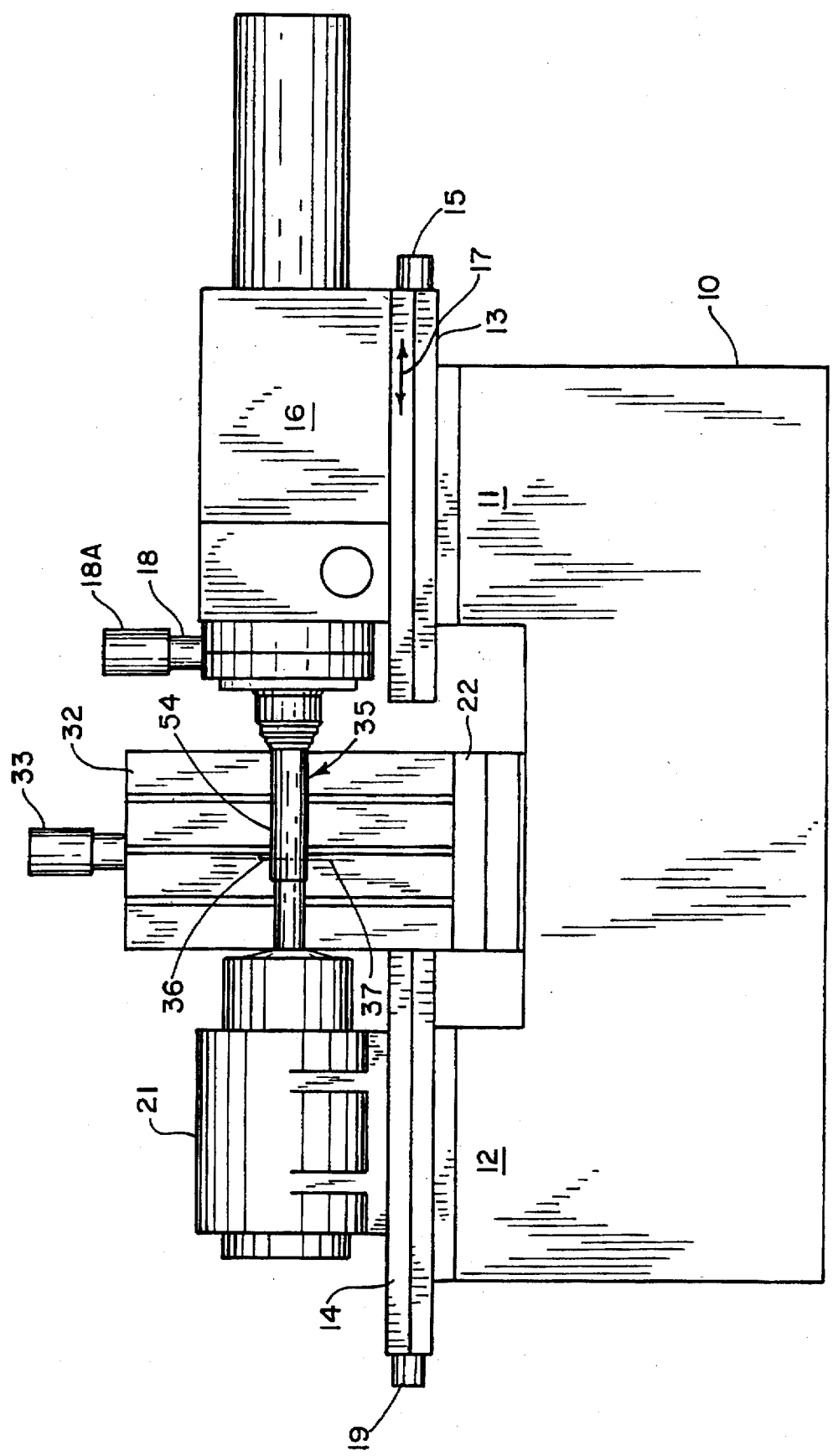
FIG. 2 is an elevational view in the direction of arrow 2 shown in FIG. 1.

Turning first to FIGS. 1 and 2, there is shown a machine base 10 that includes spaced apart upstanding pedestal sections 11 and 12 on which there is mounted dove tail slide blocks 13 and 14, respectively. Dove tail slide block 13 is operated by a selsyn drive motor 15 to move a head stock 16 back and forth within a horizontal plane indicated by arrow 17. A rotary indexing table 18 powered by a selsyn drive motor 18A is secured by conventional means to the support head 16. The rotary indexing table rotates a cutter bar about its longitudinal axis extending along the length of the cutter bar in a direction indicated by arrow 18B. A dove tail slide block 14 is operated by a selsyn drive motor 19 to move an outboard support cutter bar back and forth within the horizontal plane 17. Between the pedestal sections 11 and 12 there is an opening to allow penetrating movement of structure supported by a linear indexing table 22 supported by a spacer plate 23, that is in turn supported by a linear indexing table 24. The table 24 is supported by a pedestal section 25 that is a lateral extension of the machine base 10. The linear indexing tables 22 and 24 are each provided with the selsyn drive motors 22A and 24A, respectively, per se, known in the art, and controlled through the use of suitable control signals to move the indexing tables. Indexing table 22 is moved in a direction indicated by arrow 26. Indexing table 24 is controlled by the selsyn drive motor 24A to move the indexing table 24 in a direction shown by an arrow identified by reference numeral 27. An upstanding support 28 includes a vertically arranged face plate 29 reinforced by gusset plates 30. On the face plate 29, there is mounted a spacer 31 that in turn supports a vertically orientated indexing table 32. The indexing table is controlled in response to the operation of a selsyn drive motor 33 to move the table in a direction indicated by arrows identified by reference numeral 34. "T" slots, per se well known in the art, are formed in the indexing table to allow for the use of fasteners and mounting plates to secure a workpiece to the indexing table. During the machining operation, the controlled movement of one or more of the indexing tables 22, 24 and 32 allow control of the machining operation.

According to the present invention the drive head and the tail stock support a horizontally arranged bar 35 embodying a construction and arrangement of parts to present a cutting tool 36 to rotate about a rotational axis 37 that is perpendicular to the longitudinal axis extending along the elongated length of the bar 35.

Figure 3:
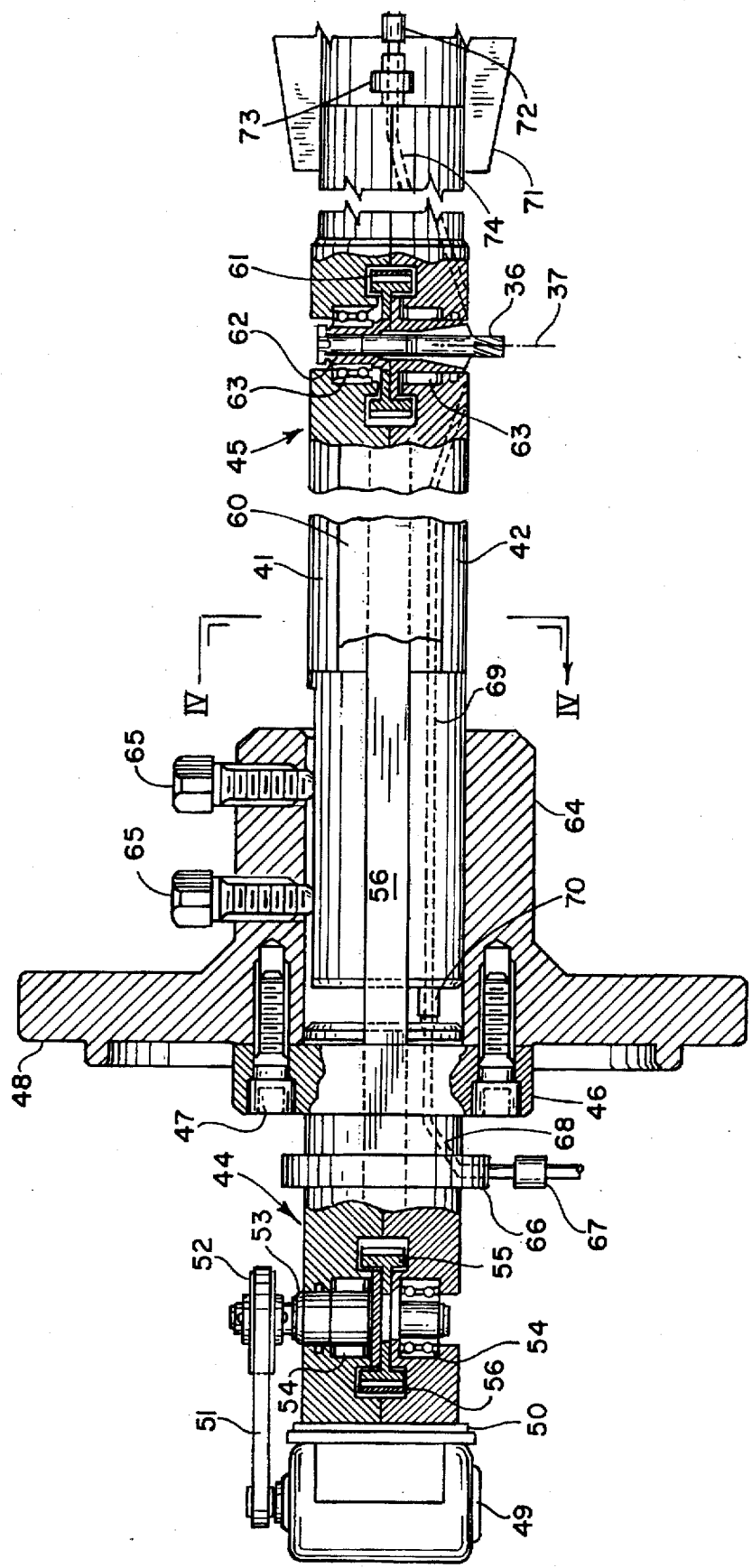
FIG. 3 is an enlarged view of one embodiment of a drive system in cutter bar forming part of the machine tool shown in FIGS. 1 and 2.
Figure 4:
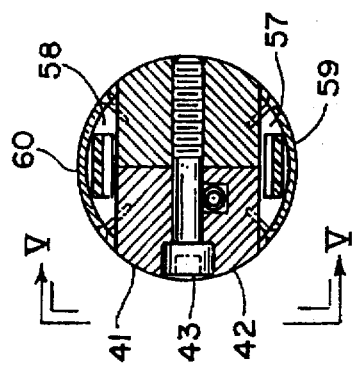
FIG. 4 is a sectional view taken along lines IV—IV of FIG. 3.
Figure 5:
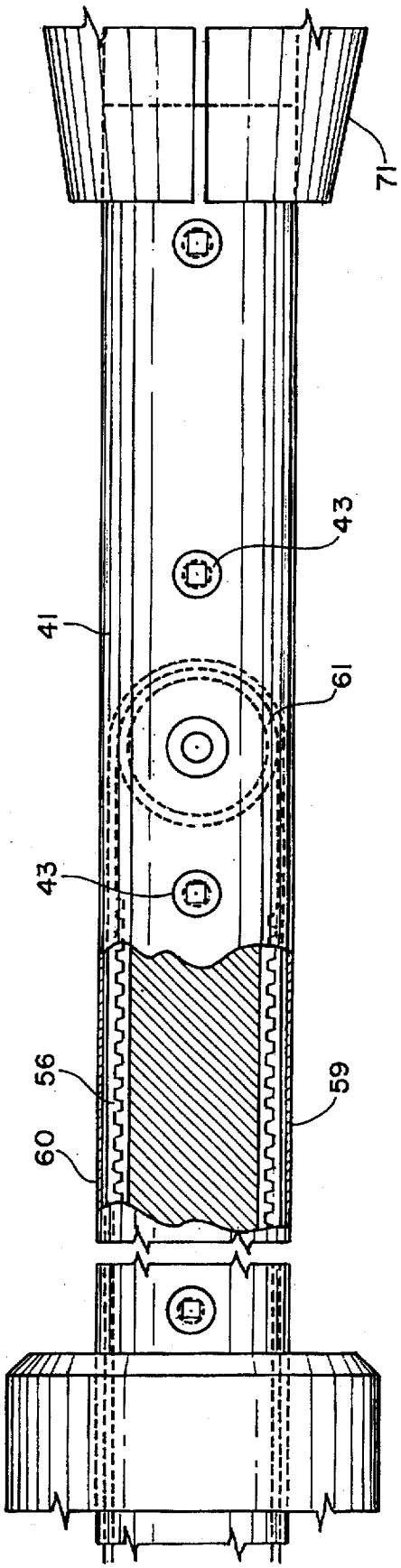
FIG. 5 is a view taken along lines V—V of FIG. 4.

A first embodiment of the cutter bar is illustrated in FIGS. 3–5. The cutter bar shown includes bar halves 41 and 42 that are formed with mating surfaces and held together to form a circular outer periphery by fasteners 43 which are located at spaced apart locations along the length of the cutter bar. The cutter bar is further made up of a drive end part 44 and a cutter end part 45. The drive end part has an annular recess into which there is received a split collar 46 that is attached by fasteners 47 to a mounting flange 48. The mounting flange is in turn provided with suitable openings to receive fasteners, not shown, for attachment of the flange to the rotary indexing table 18 on the support head 16. The drive end part 44 of the cutter bar is wholly situated in the support head which protectively houses a drive for the cutter bar that includes an electric motor 49 secured by base plate 50 to the end face of the drive end part 44. The output shaft of the motor 49 is provided with a pulley that drives a belt 51 which is trained about a pulley 52 secured to a projecting shaft of an arbor 53. The arbor 53 is supported by bearings 54 located at opposite sides of a shiv 55 having a toothed belt in contact with a drive belt 56. The drive belt extends along compartments 57 and 58 formed at opposite sides of the cutter bar and protectively enclosed by cover plates 59 and 60. The compartments 57 and 58 exist not only along the length of the drive end part 44 but also the cutter end part 45 whereby pathways are formed for the belt 56 to extend from shiv 55 to a shiv 61. Shiv 61 is supported to rotate about axis 37 by reason of mounting the shiv to an arbor shaft 62 supported by spaced apart bearing assembly 63 located in suitable cavities formed in the bar halves 41 and 42. Arbor 62 includes a hollow internal cavity suitable to receive and support a cutting tool 36. The details of the construction and relation between the cutting tool and its support member will be discussed in greater detail hereinafter in regard to the second embodiment of the cutter bar. The cutter end part 45 of the cutter bar is received in a collar 64 where it is clamped by bolts 65. The bolts are designed to be loosened and allow the cutter end part 45 to be moved in the direction of its length relative to the drive end part 44 and thereby control the tension in belt 56. Also protectively housed in the support head is a fluid supply ring 66 communicating with a coupling 67 used to attach a fluid supply line to the ring. The ring 66 remains stationary to allow the flow of fluid such as coolant or air to an internal passageways 68 and 69 formed in the respective drive end part 44 and cutter end part 45 of the bar. The passageways 68 and 69 are joined together by a jumper pipe 70 that extends in the gap between the parts 44 and 45. Passageway 69 emerges at an inclined angle adjacent to the cutter tool to supply fluid in the vicinity of the tool to facilitate the cutting operation. The cutter bar of the present invention as shown in FIGS. 3, 4 and 5 also essentially includes a support for the outboard part of the cutter bar which is opposite the mounting flange 48. This support may take the form of a collet chuck 71 that can releasably engage the end of the bar at a distance about ⅓ of its length in comparison to the length of the bar protruding from flange 48. Within the collet chuck there is an internal cavity that allows a quick disconnect coupling 72 to be releasably connected to a rotary union 73 that is, in turn, joined with an internal opening 74 extending along a part of the cutter bar to a point where is emerges at an inclined angle for discharging a fluid medium from the general vicinity of a cutting operation. Usually, ducts 69 and 74 are used alternately depending on the direction of movement of the workpiece during a machining operation.

Figure 6:
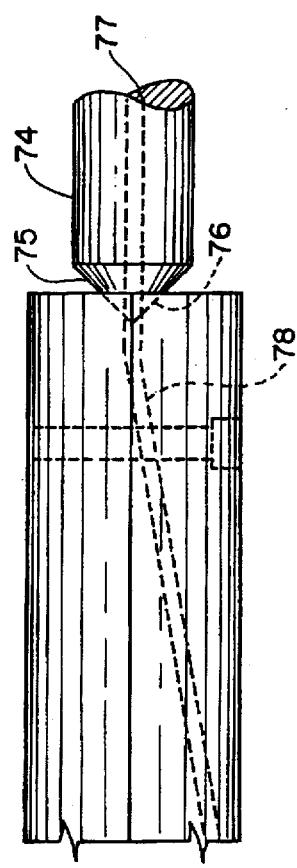
FIG. 6 is a partial view of an alternative end support arrangement for the cutter bar of the present invention.

In FIG. 6 there is illustrated an alternative support arrangement for the outboard end of a cutter bar. In this arrangement a live center 74 having cone shaped end 75 is seated in a recess 76 formed in the end face of the cutter bar. A passageway 77 in the live center extends to and communicates with a fluid passageway 78 in the cutter bar end part for delivering a fluid medium to the vicinity of a cutting tool in a manner described hereinbefore in regard to FIGS. 3–5. The use of the live center 74 offers the advantage that the cutter bar can be supported at its outboard end within a cavity located deeply within a workpiece and still obtain a chatter-free cutting operation.

Figure 7:
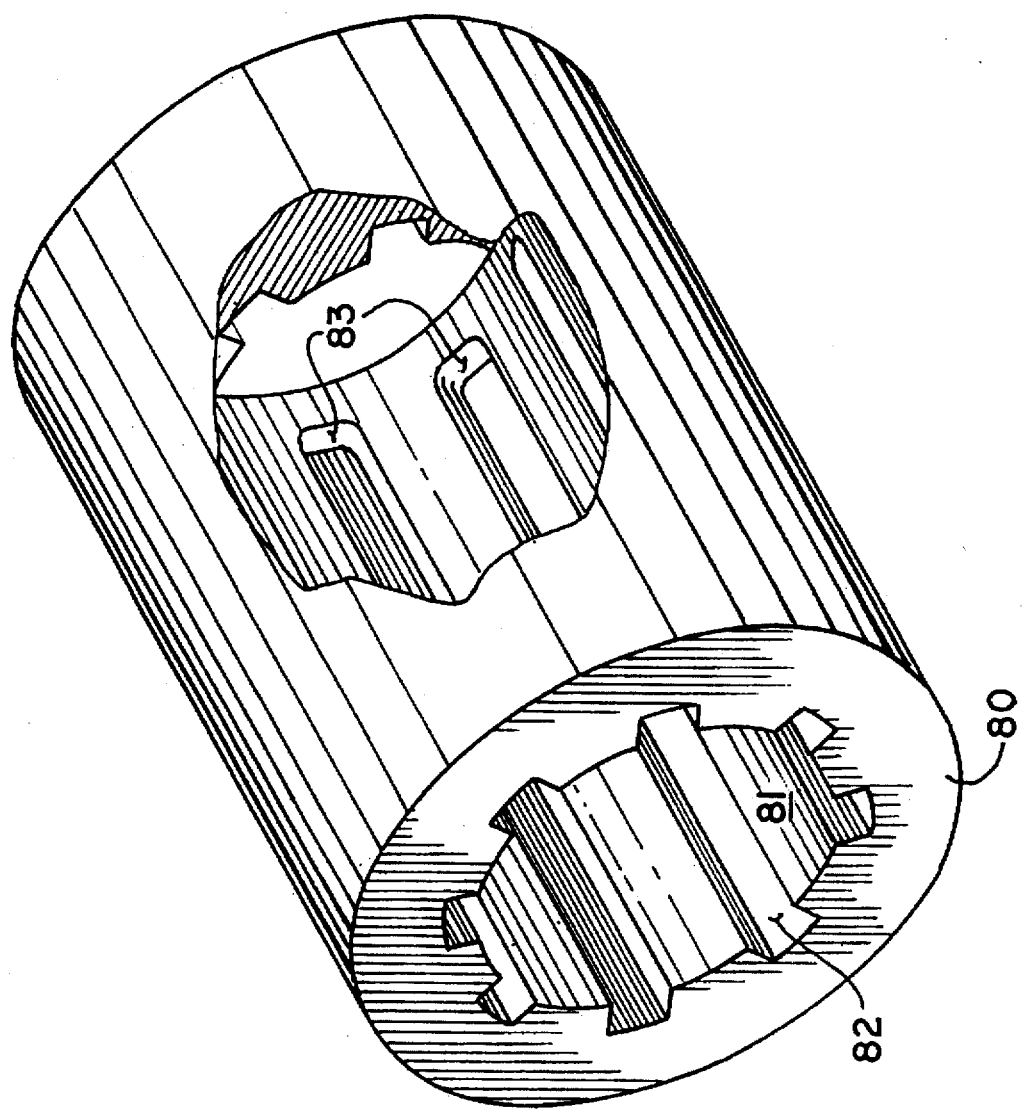
FIG. 7 is an isometric view of a cylindrical shaped workpiece showing splines in the internal surface formed by the machine tool of the present invention.

An example of this machining operation is shown in FIG. 7 wherein a sleeve 80 is provided with raised splines 81 at each of angularly spaced locations about the internal cavity which is annular. Between the raised splines 81, the cutting tool of the present invention can be used to machine the relief areas 82 along an extended length ending blindly at an end wall 83 at a site deep within the cavity of the workpiece. For these machining operations the workpiece is moved along an axis identified by arrow 17 (FIG. 1). Successive machining operations are interrupted by rotatably repositioning the cutter bar to angularly relocate the cutter tool about the longitudinal axis of the cutter bar through operation of the rotary index table 18. The cutter bar can be rotated during operation of the cutter tool to form an annular internal recess in a cavity while the workpiece remains stationary. Moreover, without loss to the setup position of the workpiece, the cutter bar can be withdrawn from the internal cavity of the workpiece and the workpiece repositioned through operation of liner slides to bring about an orientation of a cutter tool at a desired machine site at the exterior of the workpiece. The cutter bar arrangement of the present invention enables the use of a cutter bar having a diameter or transverse dimension that is only slightly less than the minor diameter of the opening in the workpiece. The essential requirement is that the projecting cutter tool extend from the surface of the bar by a distance no greater than the depth of penetration for the machining operation. The cross-sectional dimension of the bar can be small, of the order of 1inch and in an ideal circumstance ½ inch. The cutting operations, however, are not compromised since the support accorded to the bar at its outboard end enables a bar of considerable length to be utilized. Moreover, the cross-sectional configuration of the bar as well as the transverse dimensions at various sites along the bar can be altered and chosen for specific conditions. It is within the scope of the present invention to allow a bar construction having a reduced diameter, neck down portion at some point along the length of the bar to accommodate-requirements for machining a particular workpiece. The transverse configuration of the bar can be that of a "T", "I" or "U" configuration The machine tool of the present invention is particularly useful for machining an internal surface in a cavity within a workpiece because the cutter tool can be advanced along the internal cavity for path of cut and stopped without the usual requirement for a clearance at the end of the path of cut. The support afforded the cutter bar during the machining operation avoids the problem caused by deflection under the cutting forces, such as eliminating chatter. A cavity can be quite small requiring essentially sufficient space to accommodate the length of the cutting tool projecting from the bar and the need to provide sufficient space for accumulation of chips produced during the cutting operation. The diameter of the cutting bar can accordingly be reduced because of the support accorded the cutter bar by the outboard support. By this combination and relationship of parts there can be achieved a cutting operation of extreme versatility and usefulness for various types of cutting operations.

Figure 8:
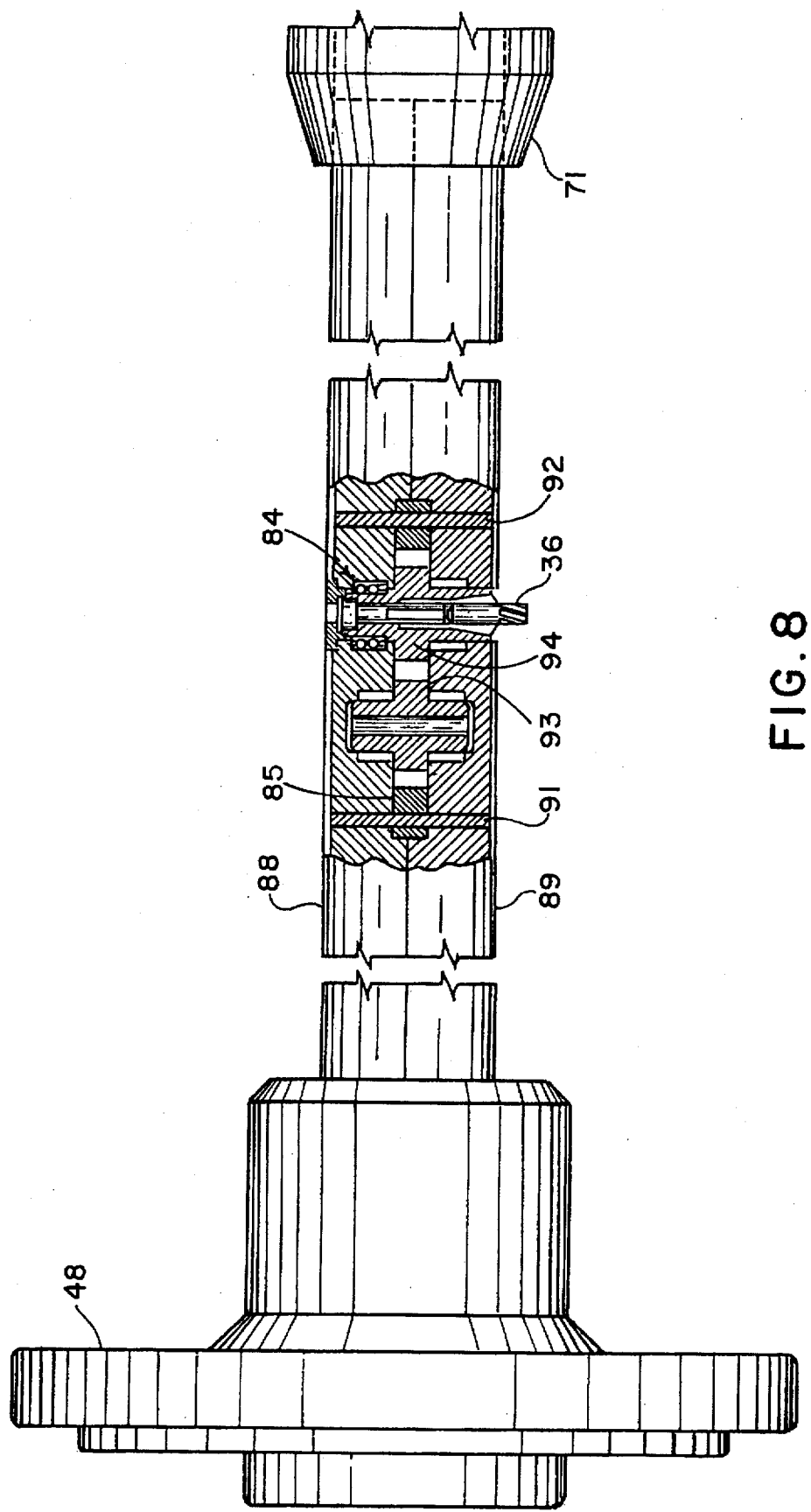
FIG. 8 is a view similar to FIG. 3 but illustrating a second embodiment of a drive system in a cutter bar according to the present invention.
Figure 9:
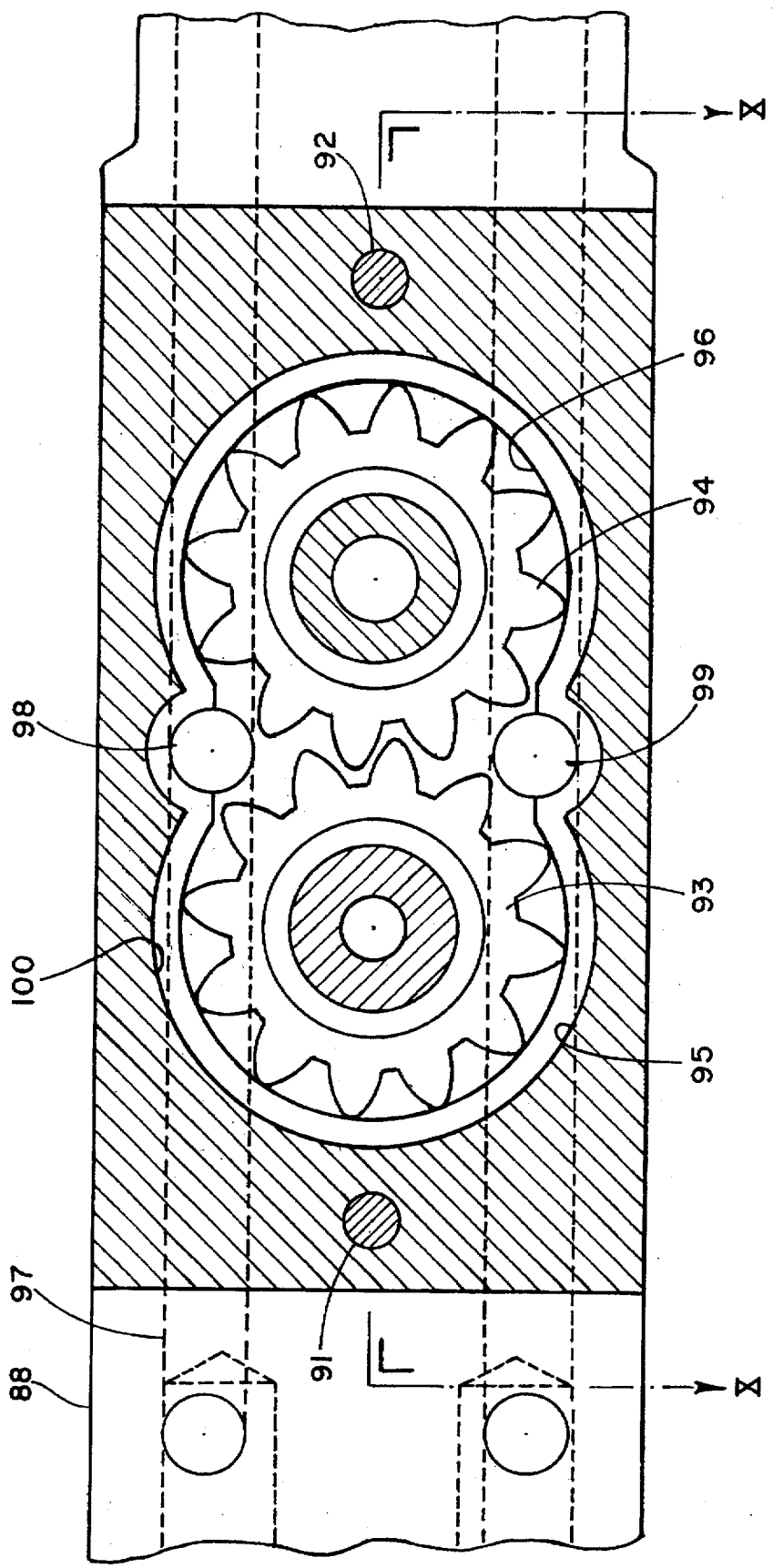
FIG. 9 is an enlarged view in section showing the hydraulic motor drive section as shown in FIG. 8.
Figure 10:
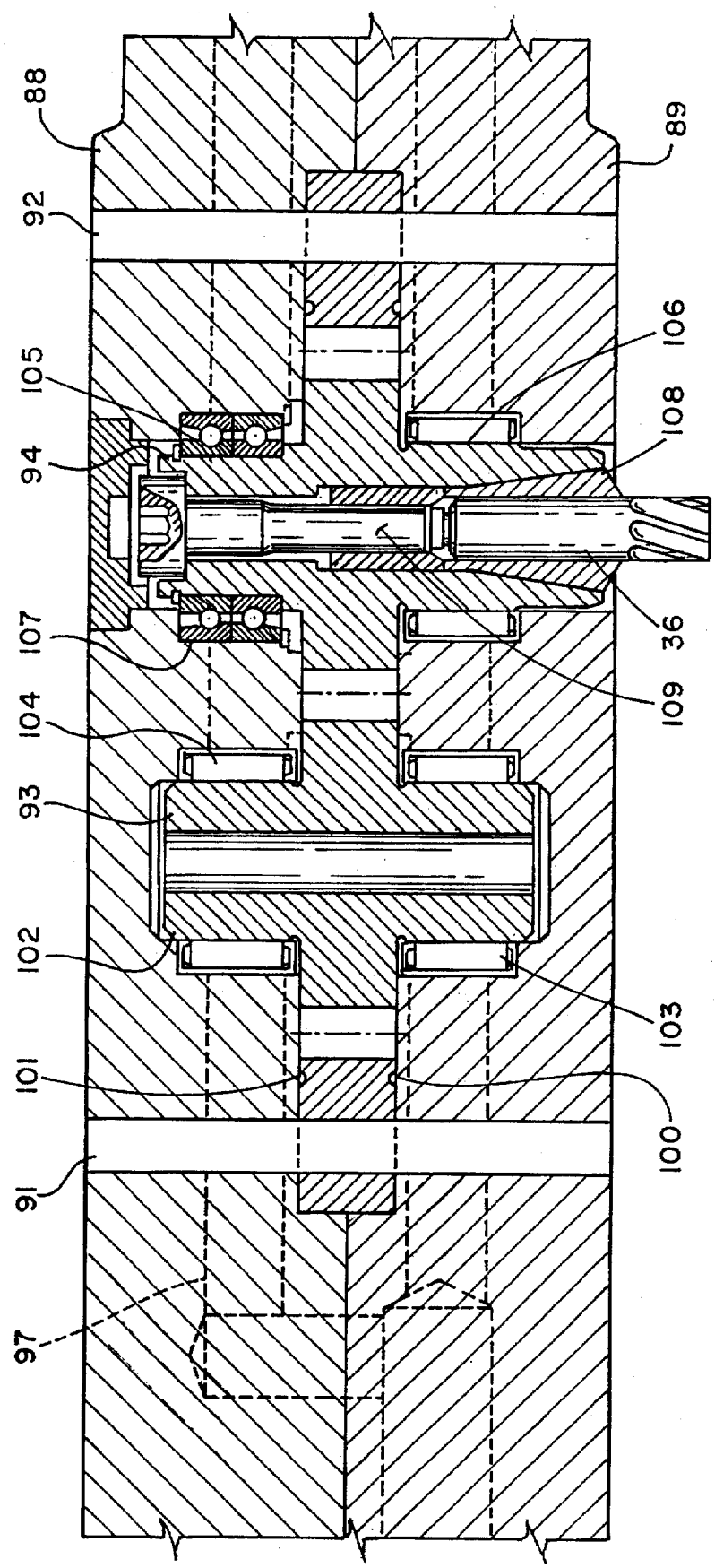
FIG. 10 is a sectional view taken along lines X—X of FIG. 9.

A second embodiment of the cutter bar is shown in FIGS. 8, 9 and 10 which differs from the embodiments described hereinbefore by the provision of a hydraulically powered rotary actuator to drive the cutting tool. The hydraulic rotary actuator includes a hydraulic motor having a motor housing 85 with a rectangular configuration formed by a machined plate. The rectangular plate is received in a slot formed by identical and mating cavities in the cutter bar halves 88 and 89, respectively, and clamped between the mutually engaging face surfaces of the cutter bar halves by threaded fasteners, not shown. The motor housing is interlocked to the cutter bar halves by bars 91 and 92 that are fitted in aligned openings in the motor housing and the cutter bar halves. Impellers 93 and 94 are supported in intersecting annular openings 95 and 96 as shown in FIG. 9. The impellers 93 and 94 have radially extending teeth that rotate into and out of a meshing relation. A source of pressurized hydraulic fluid is supplied from the support head to a duct 97 extending internally along a cutter bar half to a transversely extending supply duct 98 formed in the motor housing. A drain duct in the motor housing allows flow of hydraulic fluid from the motor to a discharge duct 99 extending in a cutter bar half along the length thereof to the support housing. The presurized hydraulic fluid, upon entrance into the junction between the annular openings 95 and 96, drives the impellers in opposite directions of rotation, synchronously by virtue of their meshing teeth relation whereupon the hydraulic fluid drains from the intersection of the annular openings diametrically opposite the entrance site for the hydraulic fluid. Peripheral grooves 100 and 101 are formed in the oppositely disposed face surfaces of the motor housing and receive seals to establish a fluid tight sealed relation between the motor housing and the cutter halves.

As best shown in FIG. 10, impeller 93 is provided with oppositely extending arbors 102 and 103 that are rotatably supported by bearings 104 received in counter bored cavities formed in the cutter bar halves. Similarly, impeller 94 is provided with oppositely extending arbors 105 and 106 that are rotatably supported by bearings 107 seated in counter bore cavities formed in the cutter bar halves. The impeller 94 has a central opening which in the arbor 106 has a tapered configuration to receive a collet 108 used to releasably secure the cutting tool 36. The support of cutting tool 36 is made by the collet arrangement shown in FIG. 12 and described hereinafter according to the present invention. The collet 108 extends in the internal cavity of the impeller 94 where a cylindrical bore section slidably receives a threaded portion of the collet that engages with the threads of a bolt member 109. The head of the bolt member seats in a recess formed in the arbor 105. By torquing the bolt member 109 the collet is drawn toward the head of the bolt member, thus clamping the cutting tool in the collet. Conversely by releasing torque on the fastener, the collet is moved in a direction to expel the collet from the tapered surfaces, thus releasing the cutting tool. It is important however to provide a construction and arrangement of parts so that the collet is arranged in relation to spaced apart bearings so that the collet is always free to expand without distorting the bearing seat surfaces. Such an arrangement is shown in FIG. 12.

Figure 11:
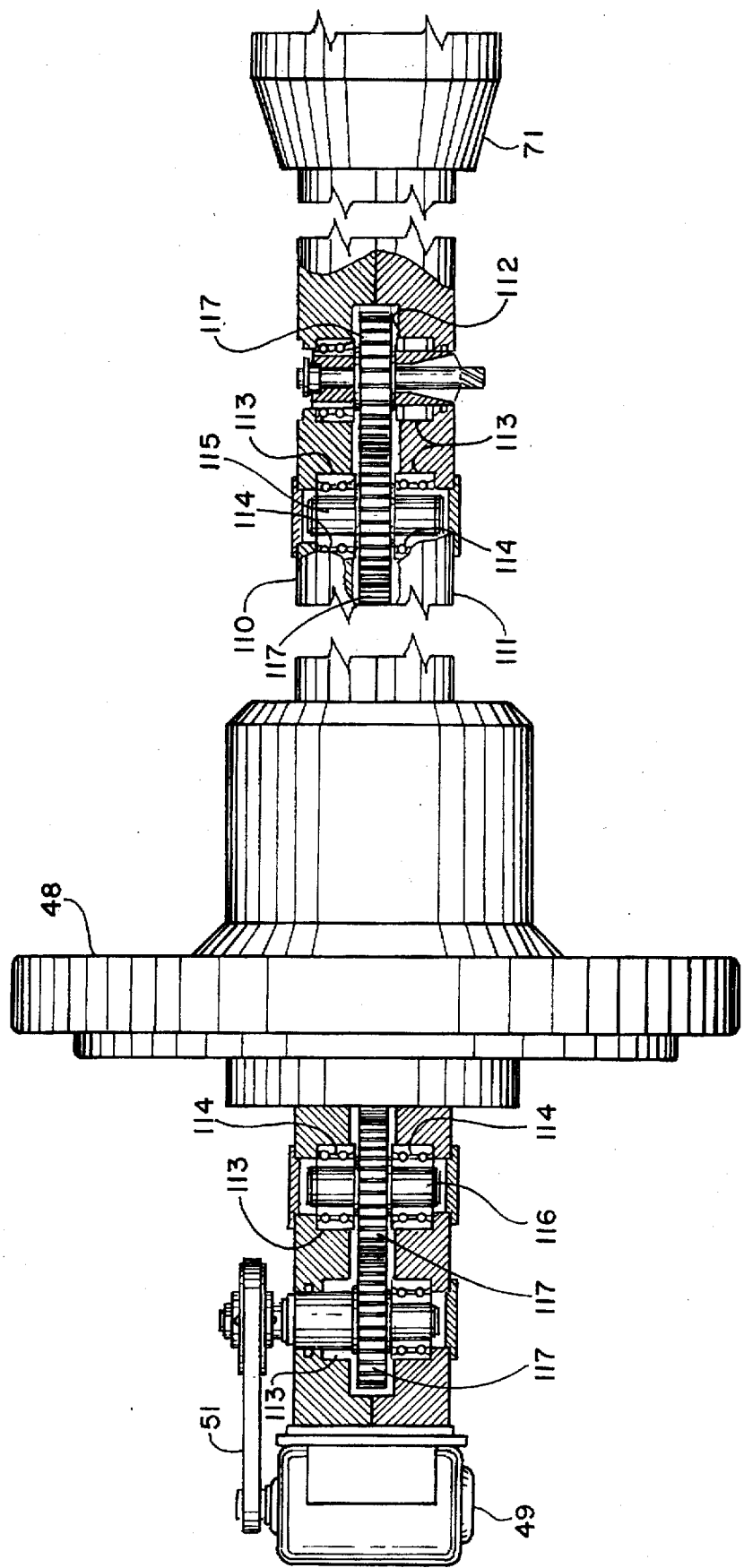
FIG. 11 is a view similar to FIG. 3 but illustrating a third embodiment drive system in the cutter bar according to the present invention.

In FIG. 11 there is illustrated a third embodiment of the cutter bar according to the present invention. The cutter bar in this embodiment is made up of two cutter bar halves 110 and 111 that are secured together by a threaded fasteners in the same manner as shown and described with respect to the first embodiment. Elements which are identical with those already described and shown in regard to the first embodiment, bear the same reference numeral and accompanying description in the embodiment shown in FIG. 11. In each cutter bar half there is a cavity 112 extending along the length thereof and in each cavity there are at spaced apart locations counter bores 113 that receive anti-friction bearings 114 used to rotatably support shaft members. These shaft members comprise shaft 115 in the projected central portion of the cutter bar and shafts 116 at each of spaced apart locations along the projected length of the cutter bar located in the support head 16. Each of the shafts 115 and 116 comprise arbors forming part of a train of mating spur gears to impart torque that is applied to gear train by drive motor 49. Thus it can be seen that the construction of the cutter bar shown in FIG. 11 provides a drive arrangement differing from the drive arrangement in the first embodiment by the fact that the rotary motion is transferred to a series of mating spur gears.

Figure 12:
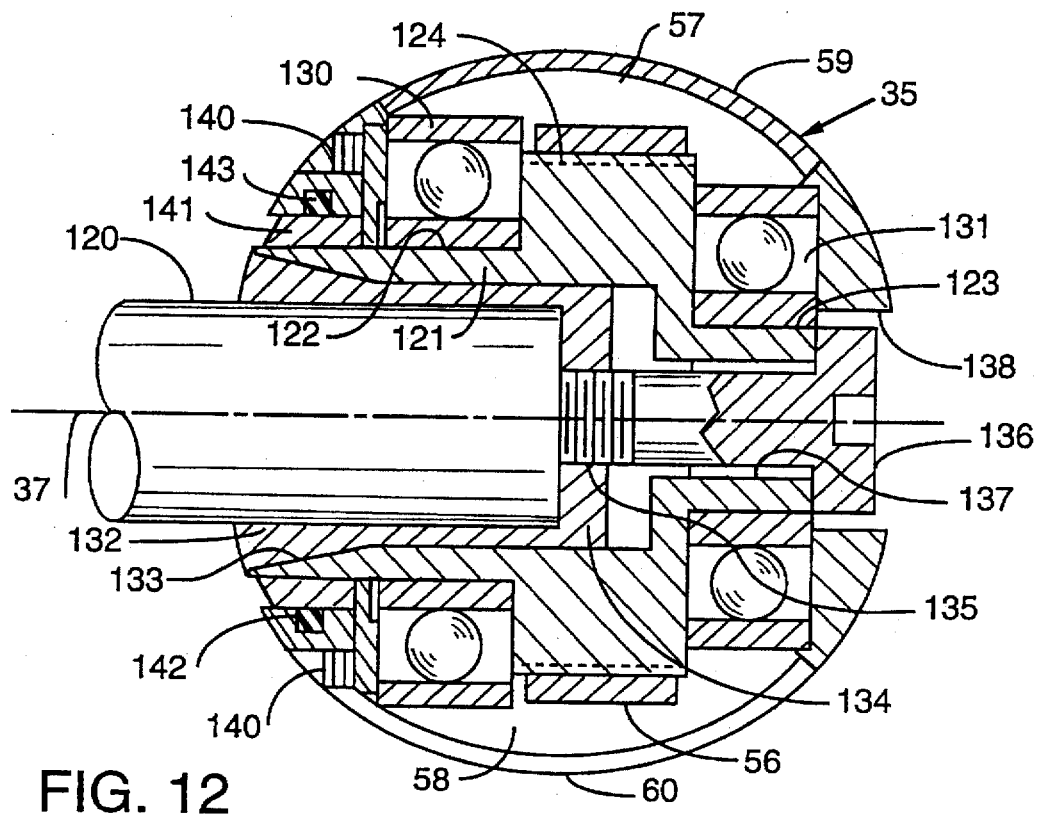
FIG. 12 is a sectional view in the plan of the cutter tool transverse of the bar illustrating a preferred form of a collet chuck for releasably gripping a cutter tool.

In FIG. 12, a cutter tool support is shown in conjunction with the cutter bar of FIG. 3–5 wherein the cutter bar embodies bar halves which are joined together by bolts. As can be seen, all of the components for supporting and driving the cutter tool 120 are contained within the interior of cutter bar 35 such that only the cutter tool 120 extends from the cutter bar. Also, it is seen that use is made of the maximum available space within the cutter bar in order to have the smallest size cutter bar for a given size of cutter tool 120. The cutter tool 120 of the embodiment shown in FIG. 12 has a cylindrical shank of ½ inch diameter to machine a ½ inch wide key slot according to American National Standard B 17.2 requirements. The associated cutter bar 35 is preferably less than 1¾ inch in diameter. As an indicator of the compactness of the resulting design, it is convenient to compare the outer diameter of the cutter bar in the region of the tool support with the diameter of the shank portion of the tool which is carried by the cutter bar. With the present invention, cutter bars having ratios of less than 4.0:1 are possible, with a most preferable range of ratios from 3.5:1 to 3.75:1. For the cutter bar having an outer diameter of 1¾ inch diameter and carrying a ½ inch tool, this ratio will be 3.5:1.

A toothed drive belt 56, as hereinbefore described, is housed within compartments 57 and 58 of cutter bar 35 and is enclosed by cover plates 59 and 60. The drive belt 56 engages a toothed portion 124 of a spindle 121 for rotating the cutter tool 120 about axis 37.

On opposite sides of the drive belt engagement, the spindle 121 includes bearing seats 122 and 123 having outer peripheries sized for contact of the spindle with ball thrust bearings 130 and 131 which provide rotational support for spindle 121.

A collet chuck 132 having an outer diameter for slidable housing within spindle 121 carries the cutter tool 120 within an inner diameter. As shown, the chuck 132 has a tapering surface 133 along an outer periphery at an end of the chuck for interfering contact With a tapering surface located along an inner periphery of the spindle 121. The collet chuck has a rear wall 134 with a threaded hole 135 for receiving the threads of a securing screw 136. The screw has a shank portion which passes through an opening 137 in an end of spindle 121 opposite the tapered end and has a head portion which bears against an end of the spindle 121 and which is contained within hole 138 in cutter bar 35. As torque is applied to the screw 136 by engagement with threaded hole 135 in rear wall 134, the collet chuck 132 is drawn into the spindle 121. This causes interfering contact of tapering surface 133 of collet chuck 132 with the tapering surface of spindle 121. This interfering contact between the tapering surfaces results in a gripping force on the cutter tool 120 for retaining the cutter tool within collet chuck 132.

An important feature of the present invention is that the interfering tapered surfaces of the collet chuck and the spindle are located laterally of, and remotely from, the bearings 130 and 131. This is important, in that any resulting distortion of the end of spindle 121 will not affect the operation of the bearings.

To provide for lateral contact and fit between the bearings, the spindle and the cutter bar, a pusher plate 139 is included and is secured by adjustment screws 140 which are contained within threaded holes in the cutter bar 35. The lateral fit is obtained in the following manner. Adjustment screws 140 contact the pusher plate 139 which is driven into contact with the outer race of bearing 130. The outer race of bearing 130 contacts the balls which in turn contact the inner race of bearing 130. The inner race of bearing 130 then contacts the spindle 121. In a similar fashion, spindle 121 contacts the outer race of bearing 131, the contact then being transferred through the balls to the inner race of bearing 131. The inner race of bearing 131 then contacts the cutter bar 35.

A support seal ring 141 serves to control the amount of deflection of the end portion of spindle 121 caused by the interfering fit with collet chuck 132. The outer periphery of support seal ring 141 also provides a sealing surface for seal 142 which is contained within a groove 143 formed in cutter bar 35. Seal 142 prevents passage of contaminants into the interior of the cutter bar.

Figure 14:
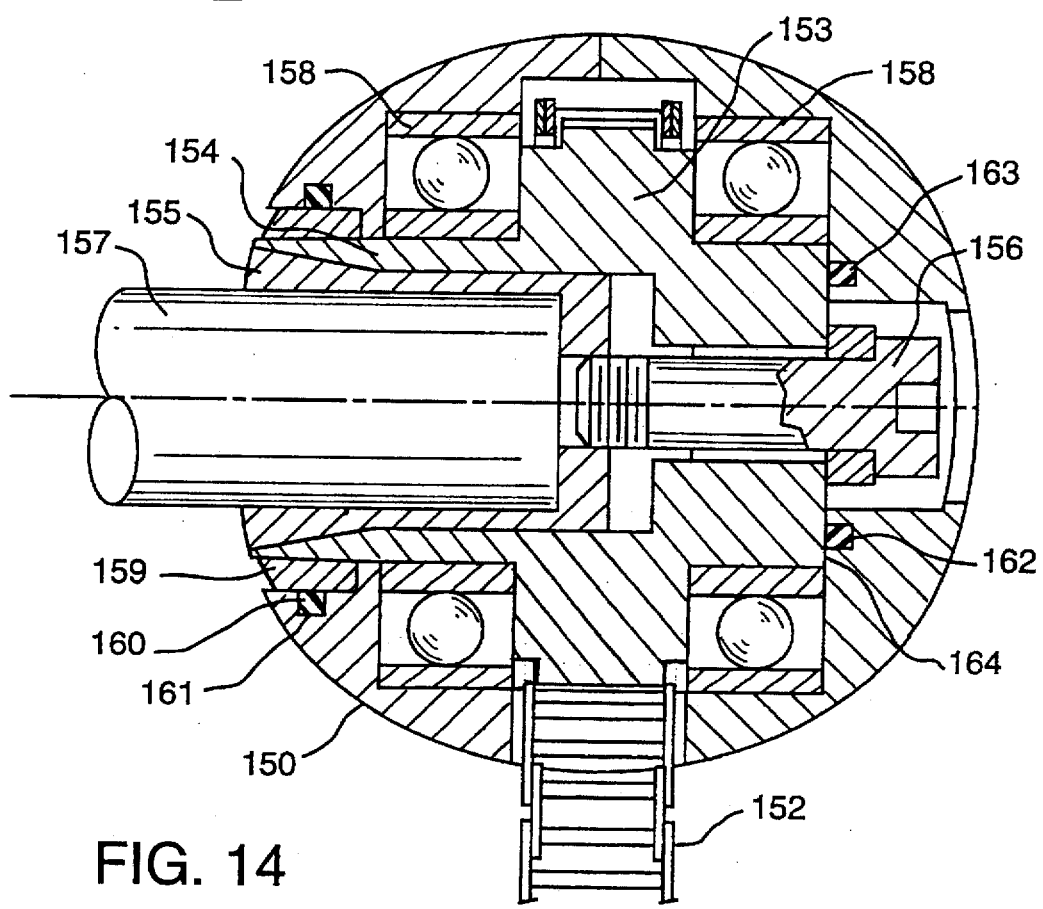
FIG. 14 is a sectional view of the cutter bar of FIG. 13 in the plan of the cutter tool transverse of the bar illustrating a preferred form of a collet chuck for releasably gripping a cutter tool.
Figure 13:
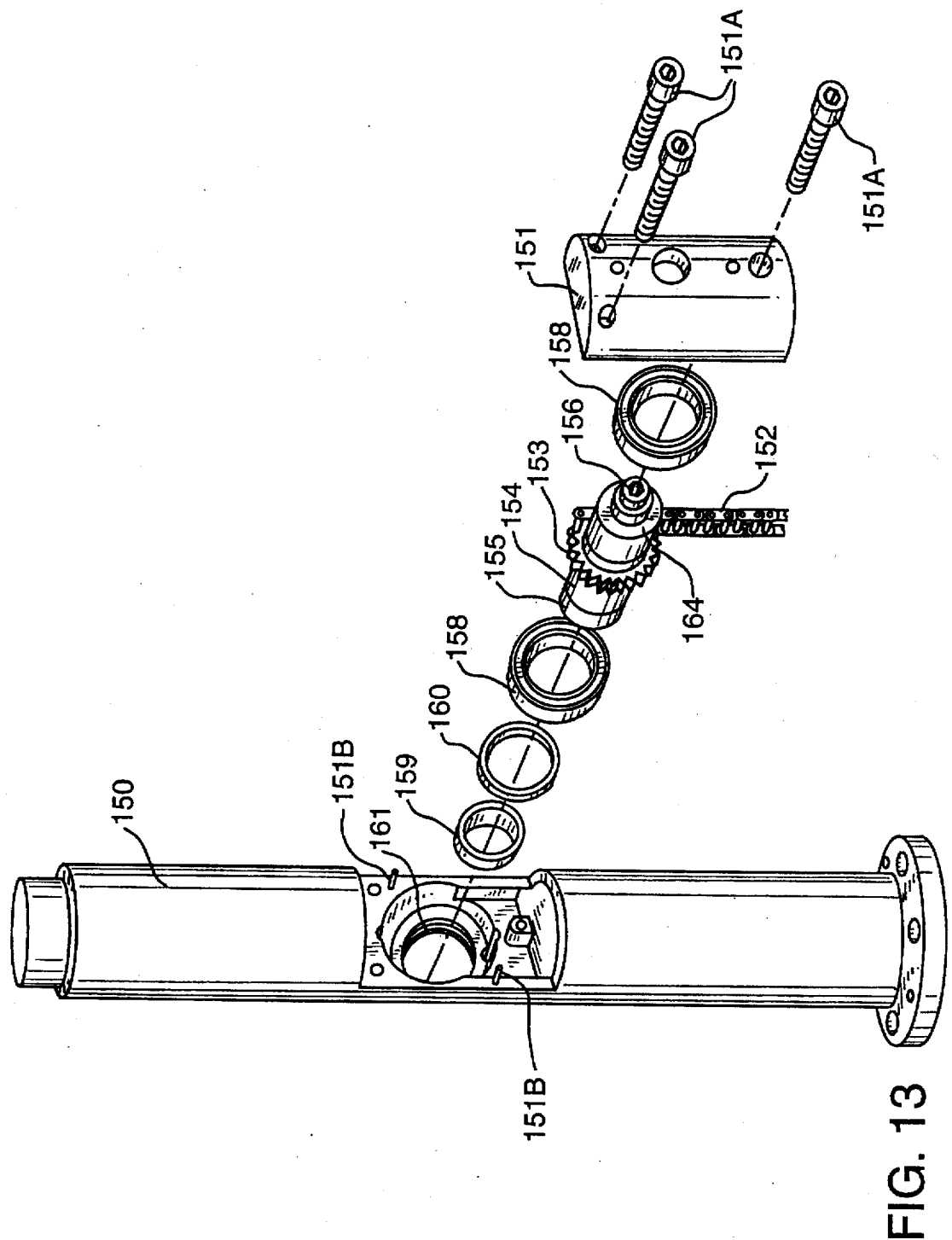

A fourth embodiment of the cutter bar is shown in FIGS. 13 and 14. As opposed to the first three embodiments which all involved bar halves bolted together at spaced apart locations, the cutter bar of the fourth embodiment involves a unitary bar 150 and a cutter drive cover 151 which is bolted to the cutter bar 150 by fasteners 151A. The cover is located on a cover bar opening in the bar 150 by indexing pins 151B which are received within openings in the cover 151.

The drive system includes a drive chain 152, which is a preferably a roller chain, for engaging the gear teeth of a sprocket 153. The sprocket is attached to an outer periphery of a spindle 154 which carries a collet chuck 155. The construction and functioning of the spindle and collet chuck has similarities to that shown in FIG. 12. The collet chuck 155 has a tapered outer surface at an end for providing gripping force for retaining a cutter tool 157 within chuck 155 upon the torquing of a screw 156. In this embodiment, however, the ball thrust bearings 158 are shown to be of equal size wherein the outer diameter of the outer races are the same. The seal supporting ring 159 serves both to limit deflection of the end of the spindle 154 and to provide a sealing surface for seal 160 which is housed in groove 161 in cutter bar 150. A seal 162 contained within a groove 163 in cover 151 provides for creating a sealing surface against end face 164 of spindle 154.

Some of the factors limiting the minimum size cutter bar which may be used to house a standard size of cutter tool through the use of the disclosed bearing and spindle construction include minimum required thicknesses for the collet chuck 155 and the spindle 154 near the tapered end of spindle 154. Also limiting the minimum size of cutterbar are loads which must be carried by the bearings 158 which will therefore require a certain minimum size of bearings for a given strength of materials selected. It was found that for cutter tools having a shank diameter ranging from ¼ to 2 inches, the above factors could be satisfied with resulting ratios of cutter bar diameter to tool shank diameter ranging from 3.25:1 to 4.0:1. Most preferably, this ratio will be in the range of 3.5:1 to 3.75:1 wherein durability of construction will mean that tool failure will most likely occur prior to failure of the tool support and driving components of the cutter bar.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. In an apparatus to machine a workpiece wherein an elongated cutter bar is carried at one end by a support head and an outwardly projecting cantilever end portion of the cutter bar supports a cutter tool for rotary movement about an axis transverse to the extended length of a cutter bar, and wherein the cutter bar includes a drive system extending therealong for imparting rotary movement to said cutter tool for machining a workpiece supported and positioned by a workpiece carrier for imparting relative movement between the cutter tool and the workpiece, the improvement which comprises:

a spindle drivingly coupled to said drive system for imparting rotary movement to said cutter tool about said axis;

bearing means supported by said cutter bar at spaced apart locations to engage with correspondingly spaced bearing seats on said spindle for rotatably supporting said spindle to rotate about said axis, said drive system including drive means drivenly coupled to said spindle between the spaced apart locations of the bearing means for imparting rotary movement to the spindle by said drive means;

truncated tapered surfaces between said spindle and said cutter tool, said truncated tapered surfaces mating and being relatively movable into an interfering relation at a site which is outboard of said spaced apart bearing seats for imparting a gripping force on one of said tapered surfaces to grip said cutter tool while rotating about said axis whereby distortion of the interfering tapering surfaces is limited to an area outboard of said bearing seats;

means for moving said truncated tapered surfaces relative to one another to establish driving contact with said cutter tool; and a support seal ring for preventing deflection of said spindle by said truncated tapered surfaces.

2. The apparatus of claim 1 wherein said cutter tool has a cylindrical shank.

3. An apparatus of claim 1 wherein said interfering tapered surfaces comprise a collet chuck.

4. An apparatus of claim 1 wherein said interfering tapered surfaces comprise truncated conical surfaces.

5. An apparatus of claim 1 wherein said interfering tapered surfaces are lateral to said bearing seats.

6. An apparatus of claim 5 wherein said interfering tapered surfaces taper outwardly from their position lateral to said bearing seats.

7. An apparatus of claim 1 wherein said bearing means comprise ball thrust bearings.

8. An apparatus of claim 1 wherein said drive system comprises a belt surface engaging said spindle.

9. An apparatus of claim 1,wherein said drive system comprises a fluid motor.

10. An apparatus of claim 1 wherein said drive system comprises a train of gears.

11. An apparatus to drivenly rotate a cutter tool about an axis extending along the length thereof from a shank at one end to a cutter head at the opposite end, said apparatus including the combination of:

an elongated cutter bar having cantilevered end portion projecting outwardly from a support head;

a spindle including a cavity having a truncated tapered surface at one lateral side of spaced apart bearing supports;

a drive system extending along said cutter bar and drivenly engaging said spindle between said spaced apart bearing supports for rotating said spindle about an axis perpendicular to the extended length of said elongated cutter bar;

bearings engaged with said spaced apart bearing supports for support internally of said elongated cutter bar;

a collet having a truncated tapered surface for moving into an interfitting relation at a site outboard said spaced apart bearing seats, said collet having a cavity for receiving a shank of such a tool to extend radially outwardly of said cutter bar for machining a workpiece; and means engaged with an end of said collet opposite said truncated tapered surface thereof to impart a gripping force on the shank of such a tool sufficient to machine a workpiece whereby distortion of interfering tapered surfaces is limited to an area outboard of said bearing seats.

12. An apparatus of claim 11 wherein said bearing means comprise ball thrust bearings.

13. An apparatus of claim 11 wherein said drive system comprises a belt surface engaging said spindle.

14. An apparatus of claim 11 wherein said drive system comprises a fluid motor.

15. An apparatus of claim 11 wherein said drive system comprise a train of gears.

16. The apparatus according to claim 11 further including a support seal ring for preventing deflection of said spindle by the interfitting relation between the truncated tapered surface of the collet and of the spindle.

17. An apparatus according to claim 11 wherein said means engaged with the end of said collet includes a securing screw threadedly engaged with said collet and internally of said elongated cutter bar.

18. The apparatus of claim 11, wherein a ratio of the outer diameter of said cutter bar adjacent to said outwardly extending tool and the outer diameter of said cutter tool shank is less than 4.0:1.

19. The apparatus of claim 18, wherein said ratio is between 3.25: 1and 4.0:1.

20. The apparatus of claim 19, wherein said ratio is 3.75:1.

21. The apparatus of claim 11, wherein said spaced apart bearings are of equal size.

22. The apparatus of claim 11, wherein said drive system includes a drive chain which engages a sprocket attached to said spindle.

23. The apparatus of claim 11, wherein said spaced apart bearings have outer races of equal sizes.

24. The apparatus of claim 22, wherein said drive chain is a roller chain.

* * * * *